United States Patent
Kauffman et al.

(10) Patent No.: US 9,467,221 B2
(45) Date of Patent: Oct. 11, 2016

(54) USE OF ALTERNATE COMMUNICATION NETWORKS TO COMPLEMENT AN AD-HOC MOBILE NODE TO MOBILE NODE COMMUNICATION NETWORK

(75) Inventors: Donald C. Kauffman, Laurel, MD (US); Tom D. Judd, Morristown, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 1157 days.

(21) Appl. No.: 12/025,685

(22) Filed: Feb. 4, 2008

(65) Prior Publication Data
US 2009/0197595 A1 Aug. 6, 2009

(51) Int. Cl.
*H04W 4/00* (2009.01)
*H04B 7/185* (2006.01)
*H04W 84/22* (2009.01)
*H04W 88/06* (2009.01)

(52) U.S. Cl.
CPC .......... *H04B 7/18508* (2013.01); *H04W 84/22* (2013.01); *H04W 88/06* (2013.01)

(58) Field of Classification Search
CPC ... H04B 7/18508; H04W 88/06; H04W 84/22; H04W 4/00; H04Q 7/20
USPC ............. 455/310, 3.01, 3.02, 427, 428, 430, 455/431, 432.1, 436, 437, 438, 439, 440, 455/441, 445, 452.1, 452.2, 456.1, 456.3, 455/41.1, 41.2, 11.1, 12.1; 370/317
See application file for complete search history.

(56) References Cited

U.S. PATENT DOCUMENTS

| | | | |
|---|---|---|---|
| 4,414,661 A | 11/1983 | Karlstrom | |
| 4,901,307 A | 2/1990 | Gilhousen et al. | |
| 5,095,480 A | 3/1992 | Fenner | |
| 5,530,909 A | 6/1996 | Simon et al. | |
| 5,710,764 A | 1/1998 | Yoshimura et al. | |
| 5,835,059 A | 11/1998 | Nadel et al. | |
| 5,933,477 A * | 8/1999 | Wu ................ | H04M 3/533 379/207.03 |
| 6,018,659 A * | 1/2000 | Ayyagari et al. ............ | 455/431 |
| 6,047,165 A | 4/2000 | Wright et al. | |
| 6,064,335 A | 5/2000 | Eschenbach | |
| 6,084,870 A | 7/2000 | Wooten | |
| 6,104,712 A | 8/2000 | Robert et al. | |
| 6,108,539 A | 8/2000 | Ray et al. | |

(Continued)

FOREIGN PATENT DOCUMENTS

| | | |
|---|---|---|
| EP | 967815 A2 * | 12/1999 |
| EP | 1793512 | 6/2007 |

(Continued)

OTHER PUBLICATIONS

Mouza et al., "Mobility Patterns", "Proceedings of the Second Workshop on Spatio-Temporal Database Management", Jul. 23, 2004, Published in: Toronto, Canada.

(Continued)

*Primary Examiner* — Pablo Tran
(74) *Attorney, Agent, or Firm* — Fogg & Powers LLC

(57) ABSTRACT

A method of communicating aircraft messages is provided. The method comprises forming an at-hoc communication network of mobile nodes. Communicating messages between the mobile nodes via the at-hoc communication network using mobile node-to-mobile node communication signals and supplementing communication gaps in the ad-hoc communication network with alternative communication signals.

16 Claims, 3 Drawing Sheets

(56) References Cited

U.S. PATENT DOCUMENTS

| | | | |
|---|---|---|---|
| 6,115,580 A * | 9/2000 | Chuprun | H04W 4/04 455/1 |
| 6,147,980 A | 11/2000 | Yee et al. | |
| 6,148,179 A | 11/2000 | Wright | |
| 6,154,636 A | 11/2000 | Wright et al. | |
| 6,160,998 A | 12/2000 | Wright et al. | |
| 6,163,681 A | 12/2000 | Wright et al. | |
| 6,173,230 B1 | 1/2001 | Camus et al. | |
| 6,181,990 B1 | 1/2001 | Grabowsky et al. | |
| 6,195,189 B1 | 2/2001 | Nishihata et al. | |
| 6,259,379 B1 | 7/2001 | Paterson et al. | |
| 6,262,659 B1 | 7/2001 | Korkosz et al. | |
| 6,271,768 B1 | 8/2001 | Frazier, Jr. | |
| 6,285,878 B1 | 9/2001 | Lai | |
| 6,308,044 B1 | 10/2001 | Wright et al. | |
| 6,353,779 B1 | 3/2002 | Simon | |
| 6,438,468 B1 | 8/2002 | Muxlow et al. | |
| 6,477,152 B1 | 11/2002 | Hiett | |
| 6,606,055 B2 | 8/2003 | Halsema et al. | |
| 6,643,274 B2 | 11/2003 | D'Annunzio | |
| 6,677,888 B2 | 1/2004 | Roy | |
| 6,744,396 B2 | 6/2004 | Stone et al. | |
| 6,778,825 B2 | 8/2004 | Parkman | |
| 6,781,513 B1 | 8/2004 | Korkosz et al. | |
| 6,788,935 B1 | 9/2004 | McKenna et al. | |
| 6,795,408 B1 | 9/2004 | Hiett | |
| 6,810,527 B1 | 10/2004 | Conrad et al. | |
| 6,816,728 B2 | 11/2004 | Igloi et al. | |
| 6,819,670 B1 | 11/2004 | Fenner | |
| 6,915,189 B2 | 7/2005 | Igloi et al. | |
| 6,925,088 B1 | 8/2005 | Moreaux | |
| 6,931,248 B2 | 8/2005 | Borel | |
| 6,940,832 B2 | 9/2005 | Saadawi et al. | |
| 6,965,816 B2 | 11/2005 | Walker | |
| 6,970,444 B2 | 11/2005 | Chwieseni et al. | |
| 6,990,319 B2 | 1/2006 | Wright et al. | |
| 7,027,812 B2 | 4/2006 | Dastrup et al. | |
| 7,072,977 B1 | 7/2006 | Bernard et al. | |
| 7,085,290 B2 | 8/2006 | Cain | |
| 7,085,562 B1 | 8/2006 | Holder et al. | |
| 7,116,266 B1 | 10/2006 | Vesel et al. | |
| 7,177,295 B1 | 2/2007 | Sholander et al. | |
| 7,177,939 B2 | 2/2007 | Nelson et al. | |
| 7,181,160 B2 | 2/2007 | Barrett | |
| 7,187,927 B1 | 3/2007 | Mitchell | |
| 7,343,157 B1 | 3/2008 | Mitchell | |
| 7,398,050 B2 * | 7/2008 | Walker | 455/3.02 |
| 7,454,203 B2 | 11/2008 | Levitan | |
| 7,463,890 B2 * | 12/2008 | Herz et al. | 455/445 |
| 7,519,014 B2 | 4/2009 | Allen et al. | |
| 7,522,628 B1 | 4/2009 | Elliott | |
| 7,599,314 B2 | 10/2009 | Wittenschlaeger | |
| 7,633,873 B1 | 12/2009 | Kohler | |
| 7,643,426 B1 | 1/2010 | Lee | |
| 7,729,263 B2 * | 6/2010 | True et al. | 370/238 |
| 7,751,815 B2 * | 7/2010 | McKenna et al. | 455/431 |
| 7,756,508 B1 | 7/2010 | Usher et al. | |
| 7,769,028 B2 | 8/2010 | Boley et al. | |
| 7,814,322 B2 * | 10/2010 | Gurevich et al. | 713/171 |
| 7,848,278 B2 | 12/2010 | Chen et al. | |
| 7,876,736 B2 * | 1/2011 | Inoue | 370/338 |
| 7,894,475 B2 * | 2/2011 | Bishop et al. | 370/466 |
| 7,907,893 B2 * | 3/2011 | Karabinis et al. | 455/12.1 |
| 7,924,761 B1 | 4/2011 | Stevens | |
| 7,940,669 B2 * | 5/2011 | Vaswani et al. | 370/238 |
| 8,023,936 B2 | 9/2011 | Hudson et al. | |
| 8,190,147 B2 * | 5/2012 | Kauffman et al. | 455/428 |
| 8,284,674 B2 | 10/2012 | True et al. | |
| 8,570,990 B2 * | 10/2013 | Kauffman | 370/338 |
| 8,577,369 B2 * | 11/2013 | Achtari et al. | 455/436 |
| 8,811,265 B2 * | 8/2014 | Horvath | 370/316 |
| 8,929,830 B2 * | 1/2015 | Ludwig et al. | 455/67.11 |
| 2002/0009993 A1 | 1/2002 | Dastrup et al. | |
| 2002/0114346 A1 * | 8/2002 | Lampe | H04L 5/16 370/465 |
| 2002/0168971 A1 | 11/2002 | Parkman | |
| 2002/0191573 A1 | 12/2002 | Whitehill et al. | |
| 2003/0003872 A1 | 1/2003 | Brinkley et al. | |
| 2003/0030581 A1 | 2/2003 | Roy | |
| 2003/0053424 A1 | 3/2003 | Krishnamurthy et al. | |
| 2003/0071743 A1 | 4/2003 | Seah et al. | |
| 2003/0072252 A1 | 4/2003 | Gurney | |
| 2003/0073406 A1 | 4/2003 | Benjamin | |
| 2003/0158963 A1 | 8/2003 | Sturdy | |
| 2003/0231574 A1 | 12/2003 | Okuda et al. | |
| 2003/0231584 A1 | 12/2003 | Zeitfuss | |
| 2004/0008253 A1 | 1/2004 | Monroe | |
| 2004/0028003 A1 | 2/2004 | Diener et al. | |
| 2004/0132495 A1 | 7/2004 | Horton, Jr. et al. | |
| 2004/0157557 A1 | 8/2004 | Barnett et al. | |
| 2004/0235469 A1 | 11/2004 | Krug | |
| 2005/0026609 A1 | 2/2005 | Brinkley et al. | |
| 2005/0053026 A1 | 3/2005 | Mullan et al. | |
| 2005/0054346 A1 * | 3/2005 | Windham et al. | 455/445 |
| 2005/0064895 A1 | 3/2005 | Oesterling et al. | |
| 2005/0090201 A1 * | 4/2005 | Lengies et al. | 455/41.2 |
| 2005/0108374 A1 | 5/2005 | Pierzga et al. | |
| 2005/0143013 A1 | 6/2005 | Jha | |
| 2005/0174950 A1 | 8/2005 | Ayyagari | |
| 2005/0197748 A1 | 9/2005 | Holst et al. | |
| 2005/0220055 A1 | 10/2005 | Nelson et al. | |
| 2005/0221814 A1 | 10/2005 | Fagan et al. | |
| 2005/0221818 A1 | 10/2005 | Johnson et al. | |
| 2005/0232185 A1 | 10/2005 | Hudson et al. | |
| 2005/0234788 A1 | 10/2005 | Hudson et al. | |
| 2005/0281270 A1 | 12/2005 | Kossi | |
| 2005/0286452 A1 | 12/2005 | Hardgrave et al. | |
| 2006/0023677 A1 | 2/2006 | Labrador et al. | |
| 2006/0031394 A1 | 2/2006 | Tazuma | |
| 2006/0080451 A1 | 4/2006 | Eckert | |
| 2006/0098608 A1 | 5/2006 | Joshi | |
| 2006/0167618 A1 | 7/2006 | Werback | |
| 2006/0176842 A1 | 8/2006 | Tamura | |
| 2006/0178141 A1 | 8/2006 | McGuffin et al. | |
| 2006/0183474 A1 | 8/2006 | Ziarno et al. | |
| 2006/0205345 A1 | 9/2006 | Ishikawa | |
| 2006/0270447 A1 * | 11/2006 | Everson et al. | 455/552.1 |
| 2007/0026866 A1 * | 2/2007 | Krishnamurthi et al. | 455/440 |
| 2007/0042773 A1 * | 2/2007 | Alcorn | 455/431 |
| 2007/0042774 A1 | 2/2007 | Alcorn | |
| 2007/0072590 A1 | 3/2007 | Levitan | |
| 2007/0150939 A1 | 6/2007 | Aaron | |
| 2007/0183435 A1 | 8/2007 | Kettering et al. | |
| 2007/0198142 A1 | 8/2007 | Werback | |
| 2007/0200761 A1 | 8/2007 | Smith | |
| 2007/0213009 A1 | 9/2007 | Higashida et al. | |
| 2007/0284474 A1 | 12/2007 | Olson et al. | |
| 2007/0286097 A1 | 12/2007 | Davies | |
| 2007/0297416 A1 | 12/2007 | Boley | |
| 2008/0095134 A1 | 4/2008 | Chen et al. | |
| 2008/0117858 A1 | 5/2008 | Kauffman | |
| 2008/0144617 A1 | 6/2008 | Molsberry et al. | |
| 2008/0150784 A1 | 6/2008 | Zhang | |
| 2008/0151811 A1 | 6/2008 | El-Damhougy et al. | |
| 2008/0186897 A1 | 8/2008 | Rune | |
| 2008/0186907 A1 | 8/2008 | Yagyuu et al. | |
| 2008/0205283 A1 | 8/2008 | McGuffin et al. | |
| 2008/0240038 A1 | 10/2008 | Lynche et al. | |
| 2008/0240062 A1 | 10/2008 | Lynch et al. | |
| 2008/0274734 A1 | 11/2008 | Kostanic et al. | |
| 2008/0291843 A1 | 11/2008 | Sonnenberg et al. | |
| 2009/0005041 A1 | 1/2009 | Steinberg | |
| 2009/0041041 A1 | 2/2009 | True et al. | |
| 2009/0058682 A1 | 3/2009 | True | |
| 2009/0077626 A1 | 3/2009 | Leclercq et al. | |
| 2009/0092074 A1 * | 4/2009 | Jamalipour et al. | 370/316 |
| 2009/0103452 A1 | 4/2009 | Horvath | |
| 2009/0103473 A1 | 4/2009 | Foster | |
| 2009/0141669 A1 | 6/2009 | Kauffman | |
| 2009/0197595 A1 | 8/2009 | Kauffman et al. | |
| 2009/0318137 A1 * | 12/2009 | Kauffman et al. | 455/428 |
| 2009/0318138 A1 | 12/2009 | Zeng et al. | |

(56) References Cited

U.S. PATENT DOCUMENTS

| | | | |
|---|---|---|---|
| 2010/0057899 A1 | 3/2010 | Henkel | |
| 2010/0157905 A1* | 6/2010 | Ahn et al. | 370/328 |
| 2010/0272012 A1 | 10/2010 | Knefelkamp | |

FOREIGN PATENT DOCUMENTS

| | | |
|---|---|---|
| EP | 1850543 | 10/2007 |
| EP | 1926234 | 5/2008 |
| WO | 03053013 | 6/2003 |
| WO | 2005069545 | 7/2005 |
| WO | 2007022353 | 2/2007 |
| WO | 2007043827 | 4/2007 |
| WO | 2007054410 | 5/2007 |
| WO | 2007059560 | 5/2007 |
| WO | 2008007861 | 1/2008 |

OTHER PUBLICATIONS

Samal, "Mobility Pattern Aware Routing in Mobile Ad Hoc Network ", May 2003, Publisher: Virginia Polytechnic Institute and State University , Published in: Blacksburg, Virginia.
Vyas et al. , "Location and Mobility Pattern Based Routing Algorithm for Mobile Ad Hoc Wireless Networks", "http://www.scs.org/getDoc.cfm?id=2466", 2003, Publisher: The Society for Modeling and Simulation International.
European Patent Office, "European Search Report", Jun. 4, 2009, Published in: EP.
Polajnar et al., "Simple and Efficient Protocols for Guaranteed Message Delivery in Wireless Ad-hoc Networks", "Wireless and Mobile Computing, Networking and Communications 2005", Aug. 22, 2005, pp. 93-100, vol. 3, Publisher: IEEE, Published in: Piscataway, NJ.
Sakhaee et al., "Aeronautical ad hoc Networks", "Wireless Communications and Networking Conference", Jan. 1, 2006, pp. 246-251, Publisher: IEEE, Published in: Piscataway, NJ.
Zhou et al., "GeoLANMAR: Geo Assisted Landmark Routing for Scalable, Group Motion Wireless Ad Hoc Networks", "Vehicular Technology Conference 2005", May 30, 2005, pp. 2420-2424, vol. 4, Publisher: IEEE, Published in: Piscataway, NJ.
"The ATN SARPs Third Edition", "Manual of Technical Provisions for the Aeronautical Telecommunications Network—ICAO DOC 9705/AN956", , Publisher: ATN.
Avionica, "Securelink", , pp. 1-2, Publisher: AVIONICA.
Carlos Jodar et al., "Wi-Fi Gatelink Trial Frankfurt and Muich, Germany White Paper", Aug. 9, 2006, pp. 1-18, Publisher: ARINC Proprietary.
Eklund et al., "IEEE Standard 802.16: A Technical Overview of the Wirelessman Air Interface for Broadband Wireless Access", "IEEE Communications Magazine", Jun. 2002, pp. i-107, Publisher: IEEE.
Hardy et al., "Aircraft Network and File Server—ARINC 763", Oct. 16, 2002, pp. 1-12, Publisher: AEEC (Airlines Electronic Engineering Committee).
"Technical Overview for Mark III Communications Management Unit (CMU)", , pp. 1-59, Publisher: Honeywell Aerospace Electronic Systems.
Hurlburt et al., "A Data Communications Concept for a SATS Scenario", "4th Integrated CNS Technologies Conference and Workshop", Apr. 2004, pp. 1-20.
Ivancic, "Modular, Cost-Effective, Extensible Avionics Architecture for Secure Mobile Communications", "2006 IEEE Aerospace Conference—Mar. 4-11, 2006 Big Sky, Montana", 2006, pp. 1-9, Publisher: IEEE.
Teledyne Technologies Inc., "Wireless Groundlink System (WGL)", "www.teledyne-controls.com/productsolution.wirelessgroundlink.groundlink.asp", 2007, pp. 1-2, Publisher: Teledyne Technologies Inc.
Teledyne Technologies Inc., "New Release", "www.teledyne-controls.com/newscenter/sco.asp", 2007, pp. 1-2, Publisher: Teledyne Technologies Inc.
Cordeiro et al., "IEEE 802.22: An Introduction to the First Wireless Standard Based on Congitive Radios", "Journal of Communications", Apr. 2006, pp. 38-47, vol. 1, No. 1, Publisher: Academy Publisher.
U.S. Patent and Trademark Office, "Final Office Action", "U.S. Appl. No. 12/143,369", Sep. 20, 2011.
U.S. Patent and Trademark Office, "Office Action", "U.S. Appl. No. 12/143,369", Apr. 14, 2011.
U.S. Patent and Trademark Office, "Office Action", "U.S. Appl. No. 12/143,369", Dec. 9, 2011.
U.S. Patent and Trademark Office, "Office Action", "U.S. Appl. No. 11/875,662", Oct. 2, 2009.
U.S. Patent and Trademark Office, "Office Action", "U.S. Appl. No. 11/950,218", Nov. 1, 2010.
U.S. Patent and Trademark Office, "Office Action", "U.S. Appl. No. 11/875,660", Sep. 17, 2010.
U.S. Patent and Trademark Office, "Office Action", "U.S. Appl. No. 11/875,660", Jun. 20, 2011.
U.S. Patent and Trademark Office, "Final Office Action", "U.S. Appl. No. 11/875,662", Mar. 17, 2010.
U.S. Patent and Trademark Office, "Final Office Action", "U.S. Appl. No. 11/950,218", Apr. 11, 2011.
U.S. Patent and Trademark Office, "Final Office Action", "U.S. Appl. No. 11/875,660", Feb. 1, 2011.
U.S. Patent and Trademark Office, "Final Office Action", "U.S. Appl. No. 11/875,660", Dec. 7, 2011.
U.S. Patent and Trademark Office, "Advisory Action", "U.S. Appl. No. 11/875,662", May 20, 2010.
U.S. Patent and Trademark Office, "Advisory Action", "U.S. Appl. No. 11/950,218", Jun. 3, 2011.
U.S. Patent and Trademark Office, "Advisory Action", "U.S. Appl. No. 11/875,660", Apr. 14, 2011.
U.S. Patent and Trademark Office, "Advisory Action", "U.S. Appl. No. 11/875,660", Feb. 22, 2012.
U.S. Patent and Trademark Office, "Pre-Appeal Brief Decision", "U.S. Appl. No. 11/875,662", Jun. 25, 2010.
U.S. Patent and Trademark Office, "Examiner's Answer", "U.S. Appl. No. 11/875,662", Oct. 27, 2010.
U.S. Patent and Trademark Office, "Pre-Appeal Brief Decision", "U.S. Appl. No. 11/875,660", Apr. 23, 2012.
U.S. Patent and Trademark Office, "Notice of Allowance", "U.S. Appl. No. 12/143,369", Apr. 12, 2012.
European Patent Office, "European Search Report", "from Foreign Counterpart of U.S. Appl. No. 11/875,660", Apr. 10, 2012, pp. 1-3, Published in: EP.
European Patent Office, "Office Action", "from Foreign Counterpart of U.S. Appl. No. 11/875,660", May 3, 2012, Published in: EP.
European Patent Office, "Office Action", "from Foreign Counterpart of U.S. Appl. No. 11/875,660", Sep. 13, 2012, pp. 1-3, Published in: EP.
U.S. Patent and Trademark Office, "Examiner's Answer", "U.S. Appl. No. 11/875,660", Aug. 16, 2012, pp. 1-16.
European Patent Office, "Office Action", "from Foreign Counterpart of U.S. Appl. No. 11/875,662", May 3, 2012, pp. 1-5, Published in: EP.
European Patent Office, "European Search Report", "from Foreign Counterpart of U.S. Appl. No. 11/875,662", Apr. 5, 2012, pp. 1-3, Published in: EP.
European Patent Office, "Communication under Rule 71(3) EPC", "from Foreign Counterpart of U.S. Appl. No. 11/950,218", Apr. 5, 2011, pp. 1-21, Published in: EP.
European Patent Office, "Office Action", "from Foreign Counterpart of U.S. Appl. No. 11/950,218", Sep. 29, 2009, p. 1, Published in: EP.
European Patent Office, "Office Action", "from Foreign Counterpart of U.S. Appl. No. 11/950,218", May 26, 2010, pp. 1-3, Published in: EP.
European Patent Office, "Extended European Search Report", "from Foreign Counterpart of U.S. Appl. No. 11/950,218", Mar. 20, 2009, pp. 1-6, Published in: EP.
U.S. Patent and Trademark Office, "Office Action", "U.S. Appl. No. 11/950,218", Aug. 28, 2012, pp. 1-27.
European Patent Office, "Office Action", "from Foreign Counterpart of U.S. Appl. No. 12/025,685", Sep. 11, 2009, p. 1, Published in: EP.

(56) References Cited

OTHER PUBLICATIONS

European Patent Office, "Office Action", "from Foreign Counterpart of U.S. Appl. No. 12/025,685", Jan. 23, 2012, pp. 1-6, Published in: EP.

European Patent Office, "Extended European Search Report", "from Foreign Counterpart of U.S. Appl. No. 12/025,685", May 8, 2009, pp. 1-6, Published in: EP.

European Patent Office, "Office Action", "from Foreign Counterpart of U.S. Appl. No. 12/143,369", Nov. 13, 2009, pp. 1-6, Published in: EP.

European Patent Office, "Office Action", "from Foreign Counterpart of U.S. Appl. No. 12/143,369", Jun. 25, 2010, pp. 1-4, Published in: EP.

European Patent Office, "Office Action", "from Foreign Counterpart of U.S. Appl. No. 12/143,369", Apr. 8, 2011, pp. 1-4, Published in: EP.

Drula et al., "Adaptive Energy Conserving Algorithms for Neighbor Discovery in Opportunistic Bluetooth Networks", "IEEE Journal on Selected Areas in Communications", Jan. 2007, pp. 96-107, vol. 25, No. 1, Publisher: IEEE.

U.S. Patent and Trademark Office, "Office Action", "from U.S. Appl. No. 11/875,662", Dec. 26, 2013, pp. 1-43, Published in: US.

U.S. Patent and Trademark Office, "Decision on Appeal", "from U.S. Appl. No. 11/875,662", Sep. 19, 2013, pp. 1-7, Published in: US.

European Patent Office, "Office Action from EP Application No. 09151372.1 mailed Feb. 3, 2014", "from Foreign Counterpart of U.S. Appl. No. 12/025,685", Feb. 3, 2014, pp. 1-4, Published in: EP.

U.S. Patent and Trademark Office, "Notice of Allowance", "from U.S. Appl. No. 11/875,662", Apr. 15, 2014, pp. 1-16, Published in: US.

Canadian Intellectual Property Office, "Office Action from CA Application No. 2,669,062 mailed Nov. 3, 2015", "from Foreign Counterpart of U.S. Appl. No. 12/143,369", Nov. 3, 2015, pp. 1-4, Published in: CA.

U.S. Patent and Trademark Office, "Office Action", "from U.S. Appl. No. 11/875,660", Jul. 8, 2015, pp. 1-15, Published in: US.

Canadian Intellectual Property Office, "Office Action from CA Application No. 2,645,527 mailed Jun. 30, 2015", "from Foreign Counterpart of U.S. Appl. No. 11/950,218", Jun. 30, 2015, pp. 1-5, Published in: CA.

U.S. Patent and Trademark Office, "Notice of Allowance and Fee(s) Due", "U.S. Appl. No. 11/875,660", Oct. 8, 2015, pp. 1-9.

U.S. Patent Office, "Decision on Appeal", "from U.S. Appl. No. 11/875,660", Apr. 23, 2015, pp. 1-9.

Canadian Patent Office, "Office Action for Canadian Patent Application No. 2,641,083", "from Foreign Counterpart to U.S. Appl. No. 11/875,660", Apr. 15, 2015, pp. 1-3, Published in: CA.

Canadian Patent Office, "Office Action for Canadian Patent Application No. 2,641,082", "from Foreign Counterpart to U.S. Appl. No. 11/875,662", Apr. 15, 2015, pp. 1-3, Published in: CA.

Canadian Intellectual Property Office, "Office Action from CA Application No. 2,651,435 mailed May 20, 2015", "from Foreign Counterpart of U.S. Appl. No. 12/025,685", May 20, 2015, pp. 1-3, Published in: CA.

Canadian Patent Office, Office Action for Canadian Patent Application No. 2,641,082, from foreign counterpart of U.S. Appl. No. 11/875,662, filed Apr. 5, 2016, pp. 1-3, Published in: CA.

\* cited by examiner

US 9,467,221 B2

USE OF ALTERNATE COMMUNICATION NETWORKS TO COMPLEMENT AN AD-HOC MOBILE NODE TO MOBILE NODE COMMUNICATION NETWORK

BACKGROUND

The use of mobile nodes to form ad-hoc communication networks provides an efficient and effective method of exchanging messages between mobile nodes as well as between a mobile node and stationary or fixed stations. For example, an ad-hoc communication network of mobile nodes can be used to relay messages to a fixed station from an originating mobile node that is beyond the communication range of the fixed station. In this example, the message is passed from one mobile node to the next mobile node that is in the direction of the fixed station until a mobile node is within the communication range of the destination station. The message is then passed onto the destination station. The use of ad-hoc communication networks eliminates the need to install and maintain significant numbers of fixed stations so that at least one will be within radio range of every mobile node traveling through a coverage area. While, the use of a mobile node-to-mobile node relay system (ad-hoc communication network) will serve many mobile nodes, it is impossible to guarantee that every mobile node will be equipped to set up the ad-hoc communication network or that there will be a sufficient number of mobile nodes positioned within the radio range of each mobile node so that a route can be found for the message from the originating mobile node seamlessly to the destination station.

For the reasons stated above and for other reasons stated below which will become apparent to those skilled in the art upon reading and understanding the present specification, there is a need in the art for an efficient and cost effective way to fill in gaps in routing options in an ad-hoc network.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a method of communicating mobile node messages is provided. The method comprises forming an at-hoc communication network of mobile nodes. Communicating messages between the mobile nodes via the at-hoc communication network using mobile node-to-mobile node communication signals and supplementing communication gaps in the ad-hoc communication network with alternative communication signals.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a method of filling gaps in service coverage for an ad-hoc communication network of mobile node network. Although, the below mobile node-to-mobile node communication networks are described in relation to aircrafts, the invention can apply to any type of ad-hoc mobile node-to-mobile node network. For example, such mobile-mobile node networks could include, but are not limited to, ground traversing military vehicles and even soldier radio networks. Hence the present invention is not limited to ad-hoc air-to-air communication networks. In one embodiment, communication satellites are used to fill in service coverage for an ad-hoc mobile node-to-mobile node communication network. In aeronautical communication embodiments, the individual strengths between the two communication systems are complementary to each other. Ad-hoc air-to-air communication networks work well where the aircraft are relatively densely spaced. Some communication satellite services, however, have a limitation that they cannot service a large number of aircraft in a small geographical region due to bandwidth limitations and/or are more expensive to use, which makes them less desirable for aeronautical communications. However, the strengths and limitations of both the air-to-air network and the communication satellite network align in such a way to make a very cost effective aeronautical communication network with world wide coverage in both dense and sparse airspace when compared to prior art solutions.

Figure 1:
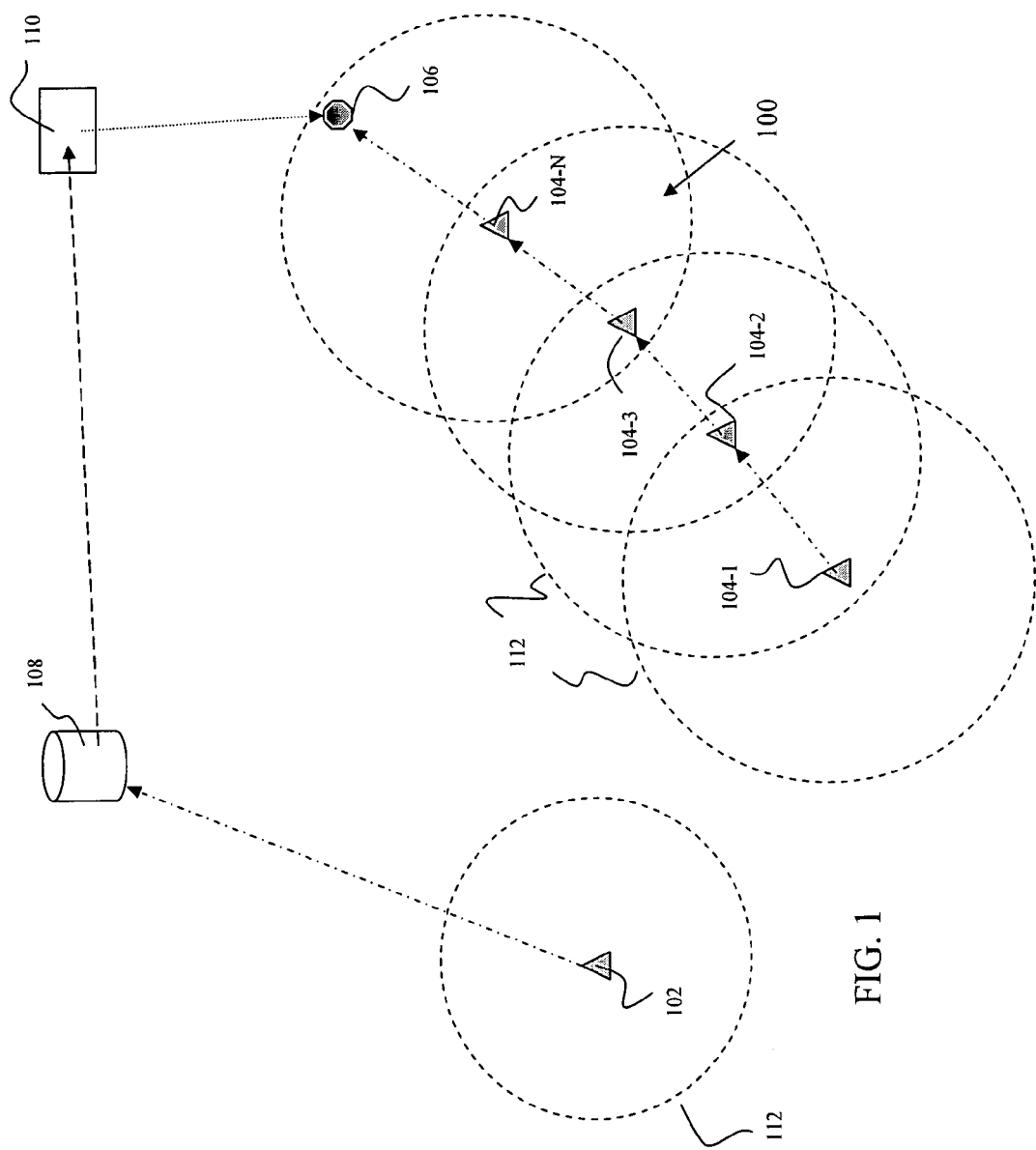
FIG. 1 is an illustration of a communication system of one embodiment of the present invention.

Referring to FIG. 1 a communication system 100 of one embodiment is illustrated. The communication system 100 includes aircraft 102, aircraft 104 (1-N), satellite 108, satellite ground station 110, and ground station 106. In this example, both aircraft 102 and aircraft 104-1 have messages to be communicated to ground station 106. The communication radio ranges 112 for each aircraft is also illustrated in FIG. 1. Communication signals (mobile node-to-mobile node signals) used for aircraft-to-aircraft communications (mobile node-to-mobile node communications) are typically line of sight communication signals such as but not limited to very high frequency (VHF) signals. In regards to aircraft 104-1, the associated message is passed along through aircraft (mobile node) 104-2, 104-3 and 104-N using the air to air communication signals until it is passed on to the destination node 106 (the ground station 106). As illustrated, the path through aircrafts 104 (2-N) to ground station 106 is possible because each aircraft 104 (2-N) is within the radio range of the aircrafts 104 (2-N) sending the message. Although, FIG. 1 only illustrates the aircraft 104 (1-N) that pass the message to the ground station, it will be understood that other aircraft within the radio range could have been included in an ad-hoc network but only those aircraft that were included in the routing path are illustrated.

In contrast to the passing of the message to the ground station 106 via the air-to-air network of aircraft 104 (1-N), the message generated by aircraft 102 needs help in reaching the ground station 106 because of a gap in the coverage. Since, aircraft 102 is not within the air-to-air communication range (or mobile node-to-mobile node communication range) of another aircraft in the direction of the ground station 106 or the ground station itself, an alternative means of communicating the message is used. In this example, once aircraft 102 discovers it cannot pass the message on to the destination node or another aircraft of an air-to-air communication network, it uses a satellite communication means to pass the message on to the destination node. Referring to FIG. 1, the message is sent from the mobile node 102 to a satellite 108. The satellite 108 then sends the message to a satellite ground station 110 which in turn communicates the message to the destination node 106. In another embodiment, the alternative communication means is a high frequency (HF) communication network including a HF transceiver 108 and an HF ground station 110. Still in other embodiments other air/ground (alternative) communication methods are used such as VHF consumer (non-aeronautical specific) and any similar communication network that serves aircraft. Moreover, it is contemplated that the destination node may not be a ground station but another aircraft or other type of mobile node.

Figure 2:
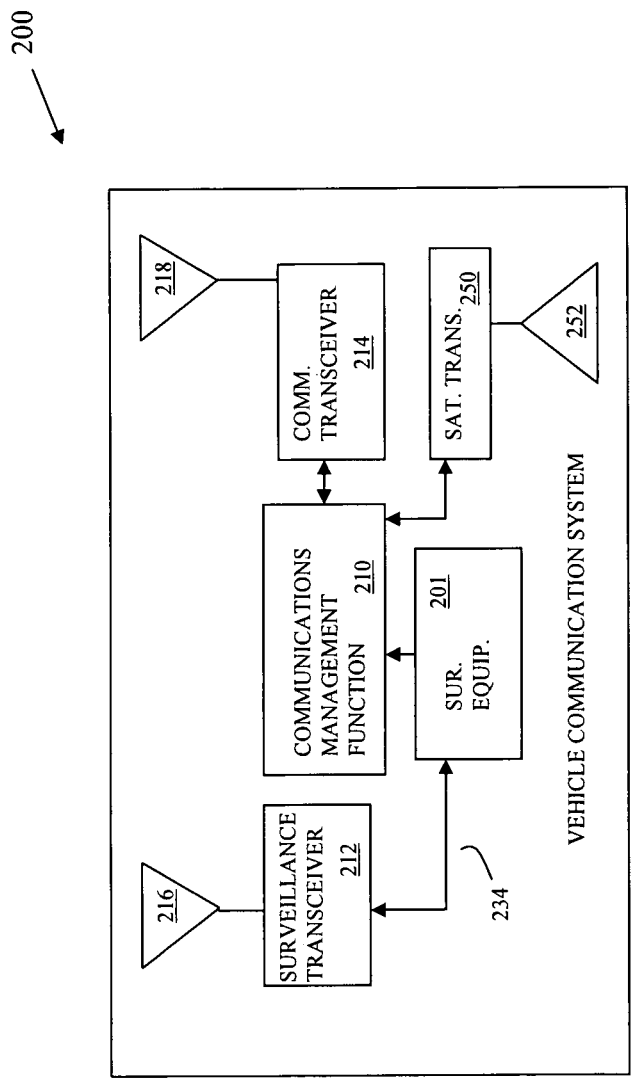
FIG. 2, is a block diagram of a mobile node communication system of one embodiment of the present invention.

FIG. 2 illustrates a vehicle communication system 200 of an aircraft of one embodiment of the present invention. The vehicle communication system 200 includes a communication management function (CMF) 210 that controls the communication of the vehicle communication system 200. In this embodiment, the vehicle communication system 200 includes two transceivers, a communication transceiver 214 and a satellite (or HF or VHF or other system) transceiver 250 in communication with the CMF 210. The communication transceiver 214 sends and receives signals via antenna 218 and the satellite transceiver 250 sends and receives messages via antenna 252. The communication transceiver 214 is used to send and receive the air-to-air signals to other aircraft. The satellite transceiver 250 is used to send and receive the alternative signals that are used to communicate with a satellite HF, VHF or other system. The vehicle communication system 200 also includes surveillance equipment 201. The surveillance equipment 201 is used to send and receive surveillance information such as vehicle position and vehicle identification. Aircraft use the surveillance information for collision avoidance reasons. As illustrated, the surveillance equipment 201 is in communication with the CMF 210. Moreover, the surveillance equipment 201 sends and receives the surveillance information via the surveillance transceiver 212 and antenna 216. In one embodiment, the surveillance equipment is used to provide position and identification information of other aircraft to the CMF 210, which uses the position and identification information to discover the topology of the ad-hoc communication network and communication paths through topology. In another embodiment, message exchange with overhead data, on the air-to-air communication network, relating to position and identification is exchanged between the aircraft to determine the topology and communication paths.

Figure 3:
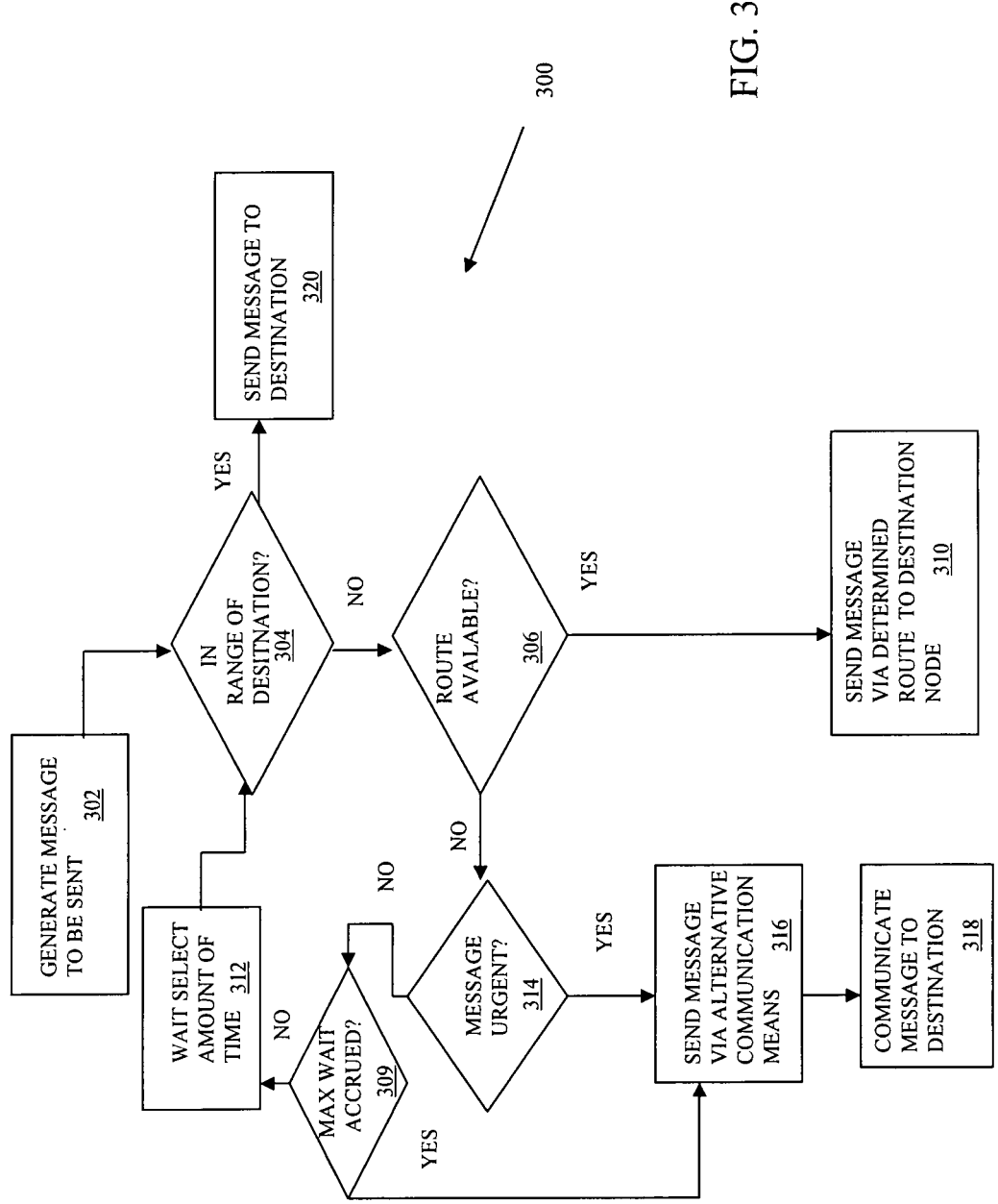
FIG. 3 is a message communication flow diagram of one embodiment of the present invention.

FIG. 3 illustrates a message flow diagram 300 of one embodiment. This method starts by generating a message to be sent by an originating aircraft 302 (or originating node). The originating node then determines if it is within communication range of the destination node (304). The communication range is the communication range for the mobile node-to-mobile node communication signals. Such signals could include but are not limited to very high frequency (VHF) signals. If the destination node is within the communication range (304), the message is sent to the destination node (320). If however, the destination node 320 is not within the communication range (304), it is determined if a complete path to the destination node is available via mobile node-to-mobile node network (306). In embodiments, it is not only determined that another mobile node is within communication range but also whether the other mobile node is in the general direction of the destination node or a route through a plurality of mobile nodes can be established in the general direction of the destination node. If a complete route to the destination is not available (306), the level of urgency of the message is determined (314).

In this embodiment, messages that are determined to not be urgent are held on to until a later time. However, if a message is determined to be urgent it is sent right away by the alternative communication means (or system). In particular, in this embodiment, if the message is determined as being urgent (314), the message is sent via the alternative communication means (316). The message is then communicated to the destination via the alternative system (318). If the message is determined not to be urgent (314), it then determines if a maximum wait time for the message was accrued (309). If a maximum wait time for the message has accrued (309), the message is sent via the alternate communication means (316). If a maximum wait time for the message has not accrued (312), a select amount of time is allowed to pass without attempting to resend the message (312). After the select amount of wait time, the process continues at (304) where it is again determined if the mobile node is within range of the destination node. Although, this embodiment only categorizes messages as urgent and not urgent it is contemplated that various level of urgency can be assigned to a message with each level warranting a different response (for example, providing different waiting periods before transmission based on the level of urgency). The period of time can be configured for all messages or for each message independently. In other embodiments, messages are held on to for a period time for other reasons such as quality of service reasons, cost of sending the signal, message type, message priority, required reliability, required security, acceptable transit delay and phase of the flight (or mobile node mission). Regarding the cost example, the messages may be held on to for a period of time due to costs associated with using the alternative communication means. Hence, a message in one embodiment is only sent to an alternative network if the available alternative network has an acceptable cost. The mobile node in the ad-hoc network may wait until another ad-hoc route in general direction of the destination becomes available or until a low cost alternative network becomes available. Moreover, in one embodiment, the message urgency is a function of the cost, phase of flight, and/or quality of service. Hence, the present invention is not limited to systems basing the transmission on acceptable delivery time, cost of delivery, quality of service or phase of flight but other factors can be used to determine how a message urgency should be handled during periods implementing the alternative communication system.

Referring back to FIG. 3, when a mobile node-to-mobile node route to the destination is determined (306), the message is sent via the mobile node-to-mobile node network to the destination (310). The mobile node that receives the message then starts the process over at (304) where it determines if it is within the communication range of the destination node. This process further continues as indicated in FIG. 3, until the message is received at the destination node.

The methods and techniques used by the CMF as described above to communication messages in an ad-hoc communication network and supplement routing paths with alternative communication signals are implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of communicating mobile node messages, the method comprising:
   forming an ad-hoc communication network between mobile nodes, wherein the ad-hoc communication network consists of mobile nodes that are within mobile node-to-mobile node communication range of each other;
   communicating messages between the mobile nodes via the ad-hoc communication network using mobile node-to-mobile node communication signals;
   determining at least one path for a message through the ad-hoc communication network toward a destination node;
   determining when at least one communication gap is encountered in the at least one path to the destination node, the at least one communication gap prohibiting transmission of the message to the destination node through any paths within the ad-hoc communication network;
   when the at least one communication gap is encountered in the at least one path to the destination node, the at least one communication gap prohibiting transmission of the message to the destination node through the ad-hoc communication network, determining whether or not to use an alternative communication network to supplement the ad-hoc communication network based on at least a first factor, wherein the alternative communication network is distinct from the ad-hoc communication network; and
   determining when to transmit through the alternative communication network based on at least a second factor, wherein determining when to transmit through the alternative communication network comprises:
   determining whether the message is urgent
      when the message is urgent, immediately transmitting the message using the alternative communication network;
      when the message is not urgent, waiting a period of time for a path through the ad-hoc communication network to become available before sending the message using the alternative communication network;
   wherein the first factor includes whether the message is urgent and
   wherein the second factor includes whether the period of time has passed since it was first determined that the at least one communication gap in the at least one path to the destination node prohibited transmission of the message to the destination node through any paths within the ad-hoc communication network such that the message cannot reach the destination node through the ad-hoc communication network.

2. The method of claim 1, wherein the alternative communication network includes at least one of a satellite network, a high frequency (HF) signal network, a very high frequency (VHF) signal network and a consumer network signal network.

3. The method of claim 1, wherein the first factor includes at least one of whether a period of time has passed since it was determined that at least one communication gap in the path to the destination node prohibited transmission of the message through the ad-hoc communication network, cost of service, class of the message, message type, message priority, required reliability, required security, acceptable transit delay, and phase of node mission.

4. The method of claim 1, wherein forming the ad-hoc communication network between the mobile nodes further comprises:
   discovering a topology of the mobile nodes within communication range of the mobile node-to-mobile node communication signals.

5. The method of claim 4, wherein communicating the messages between the mobile nodes via the ad-hoc communication network using the mobile node-to-mobile node communication signals further comprises:
   determining a path through the topology in a general direction toward the destination node, wherein the destination node is one of a mobile node and a fixed station; and
   passing a message through the topology based on the path.

6. A method of passing a message to a destination node, the method comprising:

forming an ad-hoc communication network between mobile nodes, wherein the ad-hoc communication network consists of mobile nodes that are within mobile node-to-mobile communication range of each other;

passing the message between the mobile nodes of the ad-hoc communication network towards the destination node through at least one path using mobile node-to-mobile node communication signals;

when at least one communication gap is encountered in the at least one path to the destination node through the ad-hoc communication network and the at least one communication gap prohibits transmission of the message to the destination node through the ad-hoc communication network, determining whether or not to use an alternate communication network to supplement the ad-hoc communication network based on at least a first factor, wherein the alternative communication network is distinct from the ad-hoc communication network; and determining when to transmit through the alternative communication network based on at least a second factor, wherein determining when to transmit through the alternative communication network comprises:
determining whether the message is urgent
when the message is urgent, immediately transmitting the message using the alternative communication network;
when the message is not urgent, waiting a period of time for a path through the ad-hoc communication network to become available before sending the message using the alternative communication network;
wherein the first factor includes whether the message is urgent and
wherein the second factor includes whether the period of time has passed since it was first determined that the at least one communication gap in the at least one path to the destination node prohibited transmission of the message to the destination node through any paths within the ad-hoc communication network such that the message cannot reach the destination node through the ad-hoc communication network.

7. The method of claim 6 wherein the alternative communication network includes at least one of a satellite network, a high frequency (HF) signal network, a very high frequency (VHF) signal network, and a consumer communication network signal network.

8. The method of claim 6, wherein the destination node is one of a mobile node and a fixed station.

9. The method of claim 6, wherein determining when to transmit through the alternate communication network comprises:
determining a level of urgency associated with the message; and
based on the level of urgency, delaying transmission of the message for a select period of time, wherein the lower the level of urgency of the message, the longer the select period of time.

10. The method of claim 6, wherein forming the ad-hoc communication network between mobile nodes comprises:
discovering a topology of the ad-hoc communication network based on mobile node position and identification data obtained by at least one of message exchange and surveillance equipment.

11. The method of claim 10, further comprising:
planning a path to the destination node based on the topology.

12. A non-transitory program product comprising program instructions embodied on a processor-readable medium for execution by a programmable processor, wherein the program instructions are operable to cause the programmable processor to:
form an ad-hoc communication network between mobile nodes, wherein the ad-hoc communication network consists of mobile nodes that are within mobile node-to-mobile node communication range of each other;
determine at least one path for a message through the ad-hoc communication network towards a destination node;
determine when at least one communication gap is encountered in the at least one path to the destination node, the at least one communication gap prohibiting transmission of the message to the destination node through the ad-hoc communication network;
when the at least one communication gap is encountered in the at least one path to the destination node, the at least one communication gap prohibiting transmission of the message to the destination node through the ad-hoc communication network, determine whether or not to use an alternative communication network to supplement the ad-hoc communication network based on at least a first factor, wherein the alternative communication network is distinct from the ad-hoc communication network; and
determine when to transmit through the alternative communication network based on at least a second factor, wherein determine when to transmit through the alternative communication network comprises:
determining whether the message is urgent
when the message is urgent, immediately transmitting the message using the alternative communication network;
when the message is not urgent, waiting a period of time for a path through the ad-hoc communication network to become available before sending the message using the alternative communication network;
wherein the first factor includes whether the message is urgent and
wherein the second factor includes whether the period of time has passed since it was first determined that the at least one communication gap in the at least one path to the destination node prohibited transmission of the message to the destination node through any paths within the ad-hoc communication network such that the message cannot reach the destination node through the ad-hoc communication network.

13. The program product of claim 12, wherein the program instructions are further operable to cause the programmable processor to:
discover a topology of the ad-hoc communication network.

14. The program product of claim 13, wherein the program instructions are further operable to cause the programmable processor to:
use at least one of surveillance data and message exchange data to discover the topology of the ad-hoc communication network.

15. The method of claim 1, wherein the mobile nodes are selected from at least one of aircraft, ground vehicles, and soldiers.

16. The program product of claim 12, wherein at least a first factor includes at least one of whether a period of time has passed since it was determined that at least one communication gap in the path to the destination node prohibited transmission of the message through the ad-hoc communication network, cost of service, class of the message, message type, message priority, required reliability, required security, acceptable transit delay, and phase of node mission.

* * * * *

UNITED STATES PATENT AND TRADEMARK OFFICE
CERTIFICATE OF CORRECTION

PATENT NO. : 9,467,221 B2
APPLICATION NO. : 12/025685
DATED : October 11, 2016
INVENTOR(S) : Kauffman et al.

It is certified that error appears in the above-identified patent and that said Letters Patent is hereby corrected as shown below:

At Claim 1, Column 6, Lines 2-3, replace "through any paths within the ad-hoc communication network" with --through the ad-hoc communication network--

At Claim 6, Column 7, Line 34, replace "urgent and" with --urgent; and--

Signed and Sealed this
Twenty-first Day of August, 2018

Andrei Iancu
*Director of the United States Patent and Trademark Office*